US007560506B2

(12) United States Patent
Kashiwagi

(10) Patent No.: US 7,560,506 B2
(45) Date of Patent: Jul. 14, 2009

(54) WATER- AND OIL-REPELLENT COMPOSITION AND PROCESS FOR PRODUCTION THEREOF

(75) Inventor: Masato Kashiwagi, Osaka (JP)

(73) Assignee: Daikin Industries, Ltd., Osaka (JP)

(*) Notice: Subject to any disclaimer, the term of this patent is extended or adjusted under 35 U.S.C. 154(b) by 78 days.

(21) Appl. No.: 11/578,797

(22) PCT Filed: Apr. 14, 2005

(86) PCT No.: PCT/JP2005/007236

§ 371 (c)(1),
(2), (4) Date: Nov. 15, 2006

(87) PCT Pub. No.: WO2005/103176

PCT Pub. Date: Nov. 3, 2005

(65) Prior Publication Data

US 2007/0238812 A1 Oct. 11, 2007

(30) Foreign Application Priority Data

Apr. 20, 2004 (JP) ............................. 2004-123775

(51) Int. Cl.
*C08L 27/12* (2006.01)
(52) U.S. Cl. ................... 524/544; 524/545; 524/546; 524/555; 524/556; 524/558; 524/599; 524/606; 524/926
(58) Field of Classification Search ................. 524/544; 526/242
See application file for complete search history.

(56) References Cited

U.S. PATENT DOCUMENTS

| 4,595,518 | A | * | 6/1986 | Raynolds et al. ......... 427/393.4 |
| 5,240,990 | A | | 8/1993 | Kallfass et al. |
| 5,965,656 | A | | 10/1999 | Yamamoto et al. |
| 6,774,176 | B1 | | 8/2004 | Nzudie et al. |
| 2003/0130457 | A1 | | 7/2003 | Maekawa et al. |
| 2004/0014873 | A1 | | 1/2004 | Aga et al. |
| 2004/0075074 | A1 | | 4/2004 | Kubota et al. |
| 2004/0147665 | A1 | | 7/2004 | Yoshioka et al. |

FOREIGN PATENT DOCUMENTS

| EP | 0 572 269 A1 | 12/1993 |
| EP | 0 672 691 A1 | 9/1995 |
| EP | 0 902 073 A2 | 3/1999 |
| JP | 55-71779 A | 5/1980 |
| JP | 4-248863 A | 9/1992 |
| JP | 5-17538 A | 1/1993 |
| JP | 5-247306 A | 9/1993 |
| JP | 6-49319 A | 2/1994 |
| JP | 6-166705 A | 6/1994 |
| JP | 9-291481 A | 11/1997 |
| JP | 11-255995 A | 9/1999 |
| JP | 2000-160149 A | 6/2000 |
| JP | 2002-530443 A | 9/2002 |
| JP | 2004-204073 A | 7/2004 |
| WO | WO 02/24828 A1 | 3/2002 |
| WO | WO 02/064696 A1 * | 8/2002 |
| WO | WO 02/072727 A1 | 9/2002 |
| WO | WO 02/083809 A1 | 10/2002 |
| WO | WO 03/062521 A1 | 7/2003 |

OTHER PUBLICATIONS

Machine translation of WO 2002/064696 A1 (JP 02/064696), Daikin Industries, Ltd., Aug. 2002.*
Tauer, "Heterophase Polymerization", Encyclopedia of Polymer Science and Technology, Apr. 2003, John Wiley & Sons, Inc., pp. 486-487.*
"Preliminary Risk Assessment of the Developmental Toxicity Associated With Exposure to Perfluorooctanoic Acid and its Salts", U.S. Environmental Protection Agency, Office of Pollution Prevention and Toxics, Risk Assessment Division, Apr. 10, 2003.
"Perfluoroocatanoic Acid (PFOA), Fluorinated Telemers; Request for Comment, Solicitation of Interested Parties for Enforceable Consent Agreement Development, and Notice of Public Meeting", Federal Register, Wed. Apr. 16, 2003/Notices, 18626-18633, vol. 68, No. 73, U.S. Environmental Protection Agency.
"EPA Intensifies Scientific Investigation of a Chemical Processing Aid", EPA Environmental News, Monday, Apr. 14, 2003.
EPA OPPT Fact Sheet, U.S. Environmental Protection Agency, Apr. 14, 2003.

* cited by examiner

*Primary Examiner*—Marc S. Zimmer
*Assistant Examiner*—Nicole M Buie
(74) *Attorney, Agent, or Firm*—Sughrue Mion, PLLC

(57) ABSTRACT

A water- and oil-repellent composition consisting of (A) a fluorine-containing copolymer comprising at least 20% by weight (based on the copolymer) of (a1) units derived from a polymerizable monomer having a $C_{1-6}$ polyfluoroalkyl group or a polyfluoroalkenyl group, (B) a surfactant component comprising as the essential components (b1) a nonionic surfactant having an HLB value of 12 or below and (b2) a nonionic surfactant having an HLB value of 15 or above, and (C) an aqueous medium substantially consisting of water. This composition is free from operationally or environmentally undesirable solvents and superior to conventional ones in stabilities such as mechanical stability, chemical stability, and long-term shelf stability.

14 Claims, No Drawings

WATER- AND OIL-REPELLENT COMPOSITION AND PROCESS FOR PRODUCTION THEREOF

FIELD OF THE INVENTION

The present invention relates to a water- and oil-repellent composition. Particularly, the present invention relates to a water- and oil-repellent composition which is free of a solvent undesirable in view of environment and work and which has excellent stability (mechanical stability, chemical stability, and long-term storage stability).

BACKGROUND ART

Hitherto, copolymers containing a unit derived from a polyfluoroalkyl group-containing polymerizable monomer are widely used as a water- and oil-repellent agent. In order to obtain the polyfluoroalkyl group-containing copolymer, a polymerization method such as a bulk polymerization, a solution polymerization, a suspension polymerization and an emulsion polymerization can be used. Generally, the solution polymerization and the emulsion polymerization are used. Among them, an aqueous emulsion prepared by the emulsion polymerization is industrially advantageous over a solvent dispersion prepared by the solution polymerization, in view of a work-environmental problem and an effect on environment.

In the emulsion polymerization for obtaining the aqueous dispersion of the polyfluoroalkyl group-containing copolymer, it is known that a polyfluoroalkyl group-containing polymerizable monomer is extremely water-insoluble and a reaction in a dispersion medium consisting of water can hardly proceed. Thus, a method of using a ketone and glycol organic solvent as an auxiliary solvent have been conventionally proposed for the purpose of improving the solubility. Even if, however, the aqueous dispersion is used, the use of a low flash point solvent such as acetone has a problem of product combustibility and the use of a high flash point solvent has the problem caused by an organic solvent that the environmental deterioration such as air pollution and waste water pollution are caused during processing.

Recently, a method of obtaining an aqueous dispersion of polyfluoroalkyl group-containing copolymer without using the auxiliary solvent is proposed for the purpose of solving the above-mentioned problems. For example, in JP-A-4-248863 and JP-A-11-255995, although a special emulsifier such as a fluorine-containing amine oxide and a betaine type surfactant is used as an emulsifier, the improvement of stability is inadequate and the water- and oil-repellency is also inadequate. Although, in JP-A-5-17538, JP-A-6-49319 and JP-A-9-291481, the copolymerization of hydrophilic monomers having a COOH group, an OH group or a polyoxyethylene group is carried out to improve the stability, the polymer has small fluorine content so that water- and oil-repellency is inferior. Although, in JP-A-6-166705, a solution polymerization is conducted to prepare an aqueous dispersion which is then subjected to a desolvent process, a manufacturing method is not simple and the improvement of stability is insufficient. JP-A-2000-160149 and JP-A-2002-530443 are still insufficient in stability, although some of above-mentioned problems are improved. Although, in WO02/24828, the improvement of stability is intended by adding a hydrophilic surfactant after the emulsification step using a hydrophobic surfactant and before the polymerization step, it is necessary to add the emulsifier in the course of a manufacturing process so that a manufacturing method is not simple.

In these procedures proposed, a compound having a large specific gravity is used as a polyfluoroalkyl group-containing polymerizable monomer, and the sedimentation stability of the aqueous dispersion is poor during the emulsification and after the polymerization because of use of said compound.

On the other hand, in WO02/083809 and WO03/062521, the water- and oil-repellency is inadequate, although the water- and oil-repellent composition comprising a short chain Rf group is disclosed. Although the use of a solvent is not indispensable, said publications do not have a disclosure about the composition excellent in both of the water- and oil-repellency and the stability without using the solvent, and said publications exclusively have working examples comprising the solvent. The composition, which is manufactured in accordance with the method described in the working examples except the solvent is not used, has inadequate water- and oil-repellency, and also inadequate stability.

Thus, in the conventional arts, the aqueous water- and oil-repellent dispersion simultaneously exhibiting high water- and oil-repellency and excellent storage stability with the absence of a solvent has not been obtained.

DISCLOSURE OF THE INVENTION

Problems to be Solved by the Invention

An object of the present invention is to provide an aqueous water- and oil-repellent dispersion liquid free of an operatively or environmentally undesirable solvent, particularly organic solvent, having unconventionally excellent stability (mechanical stability, chemical stability, and long-term storage stability), and is to provide a simple method of preparing said dispersion liquid.

Means for Solving the Problems

The present invention provides an aqueous water- and oil-repellent composition comprising (A) a fluorine-containing copolymer, (B) a surfactant and (C) an aqueous medium as follows:
(A) a fluorine-containing copolymer which comprises:
 (a1) a polymerizable monomer which contains a polyfluoroalkyl or polyfluoroalkenyl group having 1 to 6 carbon atoms,
 (a2) a polymerizable monomer copolymerizable with the monomer (a1), and
 if necessary, in addition to the polymerizable monomers (a1) and (a2),
 (a3) a polymerizable monomer containing a polar group or a reactive group,
  the amount of the polymerizable monomer (a1) is at least 20% by weight based on the copolymer;
(B) a surfactant which comprises:
 (b1) a nonionic surfactant having an HLB of at most 12, and
 (b2) a nonionic surfactant having an HLB of at least 15,
(C) an aqueous medium (C) which essentially consists of water.

In addition, the present invention provides a method of producing the above-mentioned aqueous water- and oil-repellent composition, comprising charging the polymerizable monomers (a1), (a2) and (a3), the surfactant (B), and the aqueous medium (C) collectively, emulsifying them and then conducting the polymerization.

The polymerizable monomer (a1) used in the present invention is a compound which has a polyfluoroalkyl group or polyfluoroalkenyl group (especially a perfluoroalkyl group or perfluoroalkenyl group), and a polymerizable unsaturated group, for example, a compound of the following formula (11):

$$(Rf-A)_n-B \quad \text{Chemical Formula (11)}$$

wherein Rf is a $C_1$-$C_6$ perfluoroalkyl group or perfluoroalkenyl group,

A is a divalent organic group or a single bond,

B is a polymerizable unsaturated group, and n is 1 or 2.

The Rf groups may have 1 to 4 carbon atoms.

The divalent organic group includes an ester group (—C(=O)O—), an amide group, an alkylene group (having 1 to 10 carbon atoms), an ether group (—O—), —$CH_2CH(OX)CH_2$— [wherein X is a hydrogen atom or an acyl group (having, for example, 1 to 5 carbon atoms)] and a combination thereof.

The polymerizable unsaturated group includes an acrylate group (—OC(=O)—CH=$CH_2$), a methacrylate group (—OC(=O)—C($CH_3$)=$CH_2$), a vinyl group (—CH=$CH_2$), a vinylene group (—CH=CH—), a vinylidene group (=C=$CH_2$), an alpha-substituted acrylate group (—OC(=O)—CX=$CH_2$ wherein X is halogen, $CF_3$ or CN).

The polymerizable monomer (a1) preferably has a specific gravity of 1.63 or less. The specific gravity is the value measured at 20° C. according to the procedures (for example, a hydrometer method and a specific gravity bottle method) of JIS K-0061.

The polymerizable monomer (a1) may be a single compound, or a mixture of at least two compounds. In the case of the mixture of at least two compounds, the specific gravity after a mixing step is preferably 1.63 or less. Each compound may have the specific gravity of 1.63 or less, or the mixture may be a mixture of a compound having a specific gravity of 1.63 or less with a compound having a specific gravity of larger 1.63. Preferably, the specific gravity of the polymerizable monomer (a1) is, for example, 1.62 or less, particularly 1.60 or less.

Recent study results (EPA Report "PRELIMINARY RISK ASSESSMENT OF THE DEVELOPMENTAL TOXICITY ASSOCIATED WITH EXPOSURE TO PERFLUOROOCTANOIC ACID AND ITS SALTS" (http://www.epa.gov/opptintr/pfoa/pfoara.pdf)) and the like clarify that a PFOA (perfluorooctanoic acid) doubtfully has a potential risk of environmental load. EPA (Environmental Protection Agency of USA) announced on Apr. 14, 2003 that the EPA intensifies the scientific investigation on PFOA. On the other hand, Federal Register (FR Vol. 68, No. 73/Apr. 16, 2003 [FRL-2303-8]) (http://www.epa.gov/opptintr/pfoa/pfoafr.pdf), EPA Environmental News for release Monday April, 2003 "EPA INTENSIFIES SCIENTIFIC INVESTIGATION OF A CHEMICAL PROCESSING AID"(http://www.epa.gov/opptintr/pfoa/pfoaprs.pdf), and EPA OPPT FACT SHEET Apr. 14, 2003 (http://www.epa.gov/opptintr/pfoa/pfoafacts.pdf) announced that a long chain fluoroalkyl group (telomer) may possibly metabolize or decompose to PFOA. In the present invention, an alternative compound having a chemical skeleton different from PFOA is used so that there is no potential risk of environmental load, since the $C_1$-$C_6$ polyfluoroalkyl or polyfluoroalkenyl group is chosen as the Rf group.

The polymerizable monomer (a1) may be compounds having the following formulas (11-1) to (11-5):

$$Rf-SO_2—N(R^1)—R^2—OCOCR^3=CH_2 \quad \text{Formula (11-1)}$$

$$Rf-R^2—OCOCR^3=CH_2 \quad \text{Formula (11-2)}$$

$$Rf-CO—N(R^1)—R^2—OCOCR^3=CH_2 \quad \text{Formula (11-3)}$$

$$RfCH_2CH(R^4)CH_2—OCOCR^3=CH_2 \quad \text{Formula (11-4)}$$

$$Rf-O—Ar—CH_2—OCOCR^3=CH_2 \quad \text{Formula (11-5)}$$

Rf: $C_1$-$C_6$ perfluoroalkyl or perfluoroalkenyl group $R^1$: H or $C_1$-$C_4$ alkyl group $R^1$: $C_1$-$C_{10}$ alkylene group $R^3$: H, $C_1$-$C_4$ alkyl group or halogen $R^4$: H or $C_1$-$C_4$ acyl group Ar: aromatic group (having, for example, 6 to 18 carbon atoms)

Specific examples of the polymerizable monomer (a1) are as follows:

$C_2F_5CH_2OCOCH=CH_2$, $C_2F_5CH_2OCOC(CH_3)=CH_2$,
$C_2F_5CH_2OCOCF=CH_2$, $C_2F_5CH_2OCOCCl=CH_2$,
$C_2F_5CH_2CH_2OCOCH=CH_2$, $C_2F_5CH_2CH_2OCOC(CH_3)=CH_2$,
$C_2F_5CH_2CH_2OCOCF=CH_2$,
$C_2F_5CH_2CH_2OCOCCl=CH_2$,
$C_4F_9CH_2CH_2OCOCH=CH_2$, $C_4F_9CH_2CH_2OCOC(CH_3)=CH_2$,
$C_4F_9CH_2CH_2OCOCF=CH_2$,
$C_4F_9CH_2CH_2OCOCCl=CH_2$,
$C_6F_{13}CH_2CH_2OCOCH=CH_2$, $C_6F_{13}CH_2CH_2OCOC(CH_3)=CH_2$,
$C_6F_{13}CH_2CH_2OCOCF=CH_2$,
$C_6F_{13}H_2CH_2OCOCCl=CH_2$,
$(CF_3)_2CFCF_2CF_2CH_2CH_2OCOCH=CH_2$,
$(CF_3)_2CFCF_2CF_2CH_2CH_2OCOC(CH_3)=CH_2$,
$(CF_3)_2CFCF_2CF_2CH_2CH_2OCOCF=CH_2$,
$(CF_3)_2CFCF_2CF_2CH_2CH_2OCOCCl=CH_2$,
$(CF_3)_2CFCH_2CH_2OCOCH=CH_2$, $(CF_3)_2CFCH_2CH_2OCOC(CH_3)=CH_2$,
$(CF_3)_2CFCH_2CH_2OCOCF=CH_2$, $(CF_3)_2CFCH_2CH_2OCOCCl=CH_2$,
$C_4F_9SO_2N(CH_3)CH_2CH_2OCOCH=CH_2$,
$(CF_3)_2CFCF_2CF_2CH_2CH(OCOCH_3)CH_2OCOCH=CH_2$,
$C_6F_{11}O—C_6H_4—CH_2OCOCH=CH_2$

The polymerizable monomer (a2) used in the present invention is preferably a fluorine-free compound. Generally the polymerizable monomer (a2) is not limited and may be a compound of the following formula (12):

$$(R-A)_n—B \quad \text{Formula (12)}$$

wherein R is $C_1$-$C_{30}$ alkyl group, cycloalkyl group, alkenyl group or cycloalkenyl group, A is a divalent organic group or a single bond, B is a polymerizable unsaturated group, and n is 1 or 2.

The divalent organic group includes an ester group (—C(=O)O— or —OC(=O)—), an amide group and an ether group (—O—). The polymerizable unsaturated group includes a vinyl group (—CH=$CH_2$), a vinylene group (—CH=CH—), a vinylidene group (=C=$CH_2$), acrylate group (—OC(=O)—CH=$CH_2$), a methacrylate group (—OC(=O)—C($CH_3$)=$CH_2$) and an alpha-substituted acrylate group (—OC(=O)—CX=$CH_2$ wherein X is halogen, $CF_3$ or CN).

The polymerizable monomer (a2) may be a compound of any of the following formula (12-1) to (12-5).

R—OCOCR³=CH₂     Formula (12-1)

R—OCOCH=CHCOO—R     Formula (12-2)

R¹—COOCH=CH₂     Formula (12-3)

R²CR³=CH₂     Formula (12-4)

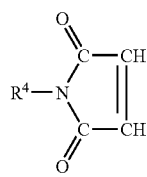

Formula (12-5)

wherein R is $C_1$-$C_{30}$ alkyl group, cycloalkyl group, alkenyl group or cycloalkenyl group,
$R^1$ is $C_1$-$C_{20}$ alkyl group,
$R^2$ is $C_1$-$C_{30}$ alkyl group, cycloalkyl group or aromatic group, or halogen,
$R^3$ is H, $C_1$-$C_4$ alkyl group, or halogen, and
$R^4$ is H, $C_1$-$C_{10}$ alkyl group or cycloalkyl group.

Specific examples of the polymerizable monomer (a2) include:
alkyl ($\geq C_{15}$) (meth)acrylates such as cetyl (meth)acrylate, stearyl (meth)acrylate and behenyl (meth)acrylate;
alicyclic alkyl or alicyclic alkenyl ($>C_6$) (meth)acrylates such as cyclohexyl (meth)acrylate, isobornyl (meth)acrylate and tricyclodecyl (meth)acrylate;
vinyl chloride;
fatty acid vinyl esters having at least 15 carbon atoms, such as vinyl stearate; and
N-alkyl maleimide, such as N-methyl maleimide and N-cyclohexyl maleimide.

Other examples of the polymerizable monomer (a2) include alkyl ($\leq C_{14}$) (meth)acrylates such as methyl (meth)acrylate, butyl (meth)acrylate, 2-ethylhexyl (meth)acrylate, lauryl (meth)acrylate; acrylonitrile, butadiene, chloroprene, isoprene, vinyl acetate, styrene, vinylidene chloride, alkyl vinyl ether, and alpha-olefin.

Preferably, the polymerizable monomer (a2) is such that a homopolymer of the polymerizable monomer (a2) has a glass transition temperature (Tg) of at least 50° C., and/or a melting point (Tm) of at least 30° C. When Tg and/or Tm are in these ranges, high water- and oil-repellency is obtained. The glass transition temperature is more preferably at least 55° C., particularly at least 60° C. The melting point (Tm) is more preferably at least 35° C.

The polymerizable monomer (a3) optionally used in the present invention contains a polar group and/or a reactive group.

Examples of the polar group include a hydroxyl group (—OH), a polyoxyalkylene group, an amino group (—NR₂ wherein R is hydrogen or a $C_1$-$C_4$ alkyl group), an N-methylol group (—NHCH₂OH), an amide group, a carboxyl group (—COOH), and a halogen group.

Examples of the reactive group include an epoxy group and a blocked isocyanate group.

Example of the polymerizable monomer (a3) include 3-chloro-2-hydroxypropyl (meth)acrylate, N-methylol (meth) acrylamide, 2-hydroxyethyl (meth)acrylate, 2-hydroxypropyl (meth)acrylate, chloromethyl styrene, glycidyl (meth)acrylate, diacetone acrylamide, glycerin mono-(meth)acrylate, polyoxyalkylene glycol mono(meth)acrylate, and blocked isocyanate group-containing (meth)acrylate.

The amount of the components (a1), (a2) and (a3) in the copolymer (A) may be as follows:
the component (a1) may be 20 to 100% by weight, the component (a2) may be 0 to 80% by weight, and the component (a3) may be 0 to 20% by weight;
the component (a1) is preferably 40 to 95% by weight, the component (a2) is preferably 5 to 60% by weight, and the component (a3) is preferably 0 to 15% by weight; and
the component (a1) is more preferably 50 to 90% by weight, the component (a2) is more preferably 9 to 50% by weight, and the component (a3) is more preferably 1 to 10% by weight, based on the copolymer (A).

The surfactant (B) used in the present invention contains the nonionic surfactant (b1) having an HLB value at most 12, preferably at most 10 and the nonionic surfactant (b2) having an HLB value at least 15. The surfactant (B) may also contain the cationic surfactant (b3).

The structure of the nonionic surfactants (b1) and (b2) includes an alkylene oxide adduct of linear and/or branched aliphatic (saturated and/or unsaturated) group; a sorbitan ester and an alkylene oxide adduct of sorbitan ester; and a polyalkylene glycol ester of linear and/or branched (saturated and/or unsaturated) fatty acid. Among them, preferable are compounds wherein the structure of alkylene oxide added moiety and the polyalkylene glycol moiety are polyoxyethylene (POE), polyoxypropylene (POP), or a POE/POP copolymer (which may be a random copolymer or a block copolymer).

The structure which does not contain an aromatic group is preferable in view of environmental problems (for example, biodegradablility and environmental hormone).

The nonionic surfactants (b1) and (b2) may be a surfactant of the formula:

$$R^1O—(CH_2CH_2O)_p—(R^2O)_q—R^3 \quad \text{Formula (21)}$$

wherein $R^1$ is an alkyl group having 1 to 22 carbon atoms or an alkenyl group having 2 to 22 carbon atoms,
$R^2$ is an alkylene group having at least 3 carbon atoms,
$R^3$ is a hydrogen atom, an alkyl group having 1 to 22 carbon atoms or an alkenyl group having 2 to 22 carbon atoms,
p is the number of at least 2, and
q is the number of 0 or at least 1.

Examples of $R^2$ include a propylene group and a butylene group.

Specific examples of the nonionic surfactants (b1) and (b2) represented by of the formula (21) include:

$C_{10}H_{21}O—(CH_2CH_2O)_p—(C_3H_6O)_q—H$ $C_{12}H_{25}O—(CH_2CH_2O)_p—(C_3H_6O)_q—H$ $C_{16}H_{31}O—(CH_2CH_2O)_p—(C_3H_6O)_q—H$ $C_{16}H_{33}O—(CH_2CH_2O)_p—(C_3H_6O)_q—H$ $C_{18}H_{35}O—(CH_2CH_2O)_p—(C_3H_6O)_q—H$ $C_{18}H_{37}O—(CH_2CH_2O)_p—(C_3H_6O)_q—H$ $C_{12}H_{25}O—(CH_2CH_2O)_p—(C_3H_6O)_q—C_{12}H_{25}$ $C_{16}H_{31}O—(CH_2CH_2O)_p—(C_3H_6O)_q—C_{16}H_{31}$ $C_{16}H_{33}O—(CH_2CH_2O)_p—(C_3H_6O)_q—C_{12}H_{25}$ iso-$C_{13}H_{27}—(CH_2CH_2O)_p—(C_3H_6O)_q—H$ wherein p and q are the same as above.

The nonionic surfactants (1) and (b2) may be surfactants of the formulas:

[Chemical Formula 2]

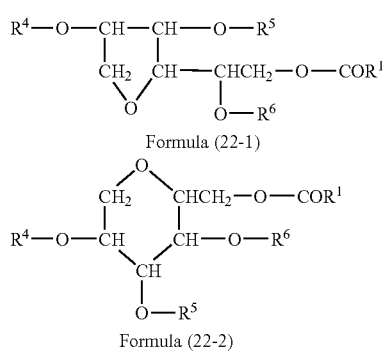

Formula (22-1)

Formula (22-2)

wherein $R^1$ is an alkyl group having 1 to 22 carbon atoms or an alkenyl group having 2 to 22 carbon atoms, and
$R^4$, $R^5$ and $R^6$ are H, $R^1CO-$, or $-(CH_2CH_2O)_p-(R^2O)_q-R^3$ (in which $R^2$ is an alkylene group having at least 3 carbon atoms,
$R^3$ is a hydrogen atom, an alkyl group having 1 to 22 carbon atoms or an alkenyl group having 2 to 22 carbon atoms,
p is the number of at least 2, and
q is the number of 0 or at least 1).

Specific examples of the nonionic surfactants (b1) and (b2) represented by the formula (22) include sorbitan monolaurate, sorbitan monostearate, sorbitan sesquistearate, sorbitan tristearate, polyoxyethylene sorbitan monostearate, polyoxyethylene sorbitan monooleate, and polyoxyethylene sorbitan tristearate.

Furthermore, the nonionic surfactants (b1) and (b2) may be a surfactant of the formula:

$$R^1COO-(CH_2CH_2O)_p-(R^2O)_q-R^7 \quad\quad \text{Formula (23)}$$

wherein $R^1$ is an alkyl group having 1 to 22 carbon atoms or an alkenyl group having 2 to 22 carbon atoms,
$R^2$ is an alkylene group having at least 3 carbon atoms,
$R^7$ is H, $R^1CO-$, or $R^3$ (in which $R^3$ is a hydrogen atom, an alkyl group having 1 to 22 carbon atoms or an alkenyl group having 2 to 22 carbon atoms),
p is the number of at least 2, and
q is the number of 0 or at least 1.

Specific examples of the nonionic surfactants (b1) and (b2) represented by the formula (22) include:

$C_{17}H_{35}COO-(CH_2CH_2O)_p-H$ $C_{17}H_{33}COO-(CH_2CH_2O)_p-H$ $C_{17}H_{35}COO-(CH_2CH_2O)_p-(C_3H_6O)_q-H$ $C_{17}H_{35}COO-(CH_2CH_2O)_p-OOCC_{17}H_{35}$ $C_{15}H_{31}COO-(CH_2CH_2O)_p-H$ $C_{11}H_{23}COO-(CH_2CH_2O)_p-H$ wherein p and q are the same as above.

The weight ratio of (b1) to (b2) is such that (b1)/(b2) may be 1/0.01 to 20, preferably 1/0.05 to 10, more preferably 1/0.1 to 10.

Another nonionic surfactant may be used together, provided that the effects are not deteriorated.

The cationic surfactant (b3) may have the structure of the following formula:

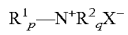

wherein $R^1$ is a linear and/or branched aliphatic (saturated and/or unsaturated) group having at least 12 carbon atoms,
$R^2$ is H or a $C_{1-4}$ alkyl group,
X is halogen, or a $C_{1-4}$ fatty acid anion group,
p is 1 or 2, and q is 2 or 3, provided that p+q=4.

The cationic surfactant (b3) is preferably an ammonium salt free from an ethylene oxide group and an aromatic group.

The amount of the cationic surfactant (b3) may be from 1 to 500 parts by weight, for example, from 5 to 300 parts by weight, based on totally 100 parts by weights of the nonionic surfactants (b1) and (b2).

The amount of the surfactant (B) may be from 0.1 to 20 parts by weight, preferably from 1 to 15 parts by weight, based on 100 parts by weight of the polymerizable monomers (the total of (a1), (a2) and (a3)).

The aqueous medium (C) used in the present invention is substantially water alone. The term "substantially water alone" means that an organic solvent may be contained in the amount of at most 3 mass %, especially at most 1 mass %, based on the amount of the fluorine-containing copolymer (A). Even if a small amount of the organic solvent is incorporated in raw materials such as an emulsifier, the significance of the present invention is not spoiled, since the organic solvent has a very small amount [for example, the content of an organic solvent is at most 3 mass % (that is, the water- and oil-repellent composition having the concentration of 30 mass % of the copolymer (A) has the organic solvent content of at most 0.9 mass %), particularly at most 1 mass % (that is, the same water- and oil-repellent composition has the organic solvent content of at most 0.3 mass %), based on the amount of the fluorine-containing copolymer (A)].

Even if a small amount of organic solvent exists, there is almost no influence on the improvement of emulsifiability and stability, and the special feature of the present invention that the emulsification and polymerization are performed without using an auxiliary solvent is not spoiled.

The aqueous water- and oil-repellent composition of the present invention can be prepared by a method which comprises collectively charging the polymerizable monomers (a1), (a2) and (a3), the surfactant (B), and the aqueous medium (C), performing the emulsification and then performing the polymerization. In the present invention, the organic solvent is not used at the time of emulsification and polymerization. The production method of the present invention is distinguished from a method of removing the solvent after the polymerization. Procedures such as a dropwise polymerization and a seed polymerization may be used, if needed.

When a part of the polymerizable monomers is gaseous, the raw materials except the gaseous monomer are collectively charged and then emulsified, and the gaseous monomer is charged before the polymerization so that the polymer can be prepared. A step of charging the gaseous monomer after the emulsification is the same as the conventional procedures wherein the solvent is used.

Preferably, in the case of the conduction of emulsification, after preliminary emulsification using, for example, a homomixer if necessary, an ultrasonic emulsifier or a high pressure homogenizer is used to emulsify the polymerizable monomer so that the emulsified polymerizable monomer has a particle size of at most 0.2 micrometers.

For the polymerization, a chain transfer agent for adjusting the molecular weight of the copolymer and a polymerization initiator can be used.

Examples of the chain transfer agent include octyl mercaptan, lauryl mercaptan, stearyl mercaptan, and 2-hydroxyethyl mercaptan.

Examples of the polymerization initiator include azo initiators such as 2,2'-azobisisobutyronitrile, 2,2'-azobis(2-amidinopropane) dihydrochloride, and 2,2'-azobis[2-(2-imidazolin-2-yl)propane]dihydrochloride, peroxide initiators such as t-butyl peroxypivalate and t-butyl peroxyneodecanoate, and redox initiators.

In the obtained aqueous water- and oil-repellent composition, the dispersed resin preferably has at most 0.25 micrometer from the viewpoint of sedimentation stability.

If necessary, the water- and oil-repellent composition of the present invention may contain additives such as a crosslinking agent, another polymer, another water-repellent agent and/or oil-repellent agent, a stain fouling agent, a moth-proofing agent, a flame retardant, an antistatic agent, a dye stabilizing agent, an anti-crease agent, an anti-shrinkage agent, a feeling processing agent, a soft-finishing agent and a antifoaming agent, according to a purpose.

The crosslinking agent includes a blocked isocyanate compound, a melamine resin compound, a glyoxal resin compound, a urea resin compound, a polymer comprising a crosslinkable monomer (for example, a blocked material of 2-isocyanatoethyl methacrylate, and N-methylol acrylamide) as an essential polymerization unit. The blocked isocyanate compound and the melamine resin compound are preferable. The blocked isocyanate compound is preferably a compound which is free of a polymerizable unsaturated group, and which has the structure wherein an isocyanate group of the polyisocyanate is blocked with a blocking agent. The melamine resin compound includes trimethylol melamine and hexamethylol melamine.

A substrate to be treated with the water- and oil-repellent composition obtained in the present invention includes textiles, paper, wood, leather, plastics, glass, brick, cement, and masonry. The textiles in the form of a fiber, a yarn or a fabric are preferable.

The substrate is treated by adhering the composition of the present invention (especially the fluorine-containing copolymer) to the substrate.

The composition according to the present invention can be applied to the substrate preferably by coating, dipping, spraying, padding, roll coating, or combination of these procedures. Generally, the substrate is immersed in the aqueous water- and oil-repellent composition, excess liquid is removed with squeeze rollers and then drying and if necessary thermal curing are conducted. The treatment amount of applying the composition of the present invention to the substrate is preferably such that the amount of the copolymer (A) is from about 0.01 to 1% by weight based on the substrate.

The "treatment" means that a treatment agent is applied to a substrate by immersion, spraying, coating or the like. The treatment gives the result that a fluorine-containing polymer which is an active component of the treatment agent is penetrated into the internal parts of the substrate and/or adhered to surfaces of the substrate.

EXAMPLES

Examples are shown hereinafter to illustrate the present invention in detail.

Properties evaluated in Examples are measured as follows:

Water- and Oil-Repellency

The polymer dispersion liquid is diluted with water to give a treatment liquid having a solid content of 0.5% by weight. A nylon taffeta cloth (NATURAINE manufactured by Kanebo, nylon-6, a dyed dark blue cloth) (Ny) and a polyester/cotton mixture cloth (twill, undyed, mercerized) (PET/C) are immersed in the treatment liquid, squeezed with a mangle to give a wet pickup of 40% (nylon) and 60% (polyester/cotton mixture), dried at 100° C. for two minutes, heated at 160° C. for one minute, and then subjected to an evaluation of water- and oil-repellency.

The water-repellency is expressed by the water repellency No. (cf. the following Table 1) determined by the spray method according to JIS (Japanese Industrial Standard) L-1092.

The oil-repellency is determined by dropping several drops of a test solution shown in the following Table 2 according to AATCC-TM118 on two positions of a surface of a test cloth and observing the penetration state of the drops after 30 seconds. The maximum point at which the test solution exhibits no penetration is expressed by the oil-repellency.

TABLE 1

| Water repellency No. | State |
| --- | --- |
| 5 | No wet on the surface |
| 4 | Slight wet on the surface |
| 3 | Partial wet on the surface |
| 2 | Wet on the surface |
| 1 | Wet over the whole surface |

TABLE 2

| Oil-repellency | Test solution | Surface tension (dyne/cm, 25° C.) |
| --- | --- | --- |
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | n-Hexadecane/Nujol mixture solution (35/65 by weight) | 29.6 |
| 1 | Nujol | 31.2 |
| 0 | Inferior to 1 | — |

Particle Diameter

The dispersion particle diameters after the emulsification and after polymerization are measured by using the following apparatus.

Model: Fiber-Optics Particle Analyzer FPAR-1000

Manufacturer: Otsuka electronics Co., Ltd.

Sedimentation Stability

After the water- and oil-repellent composition having the solid content of 30 mass % is stored at 40° C. for one month, the generation of sediment is observed. The absence of sediment is preferable.

Good: No sediment

Fair: Slight sediment

Poor: Much sediment

Mechanical Stability

The water- and oil-repellent composition is diluted with tap water to a solid concentration of 0.2 mass % and stirred with a homomixer at 3,000 rpm for 10 minutes. The generated scum is filtered off with a black cotton cloth. The absence of scum is preferable.

Good: No scum generated
Fair: Slight scum generated
Poor: Much scum generated

Chemical Stability

The water- and oil-repellent composition is diluted with tap water to a solid concentration of 0.6 mass %. 0.006 mass % of a dispersion dye is added and the mixture is intimately mixed. The generation of agglomerated material is observed. The absence of agglomerated material is preferable.

Good: No agglomerated material generated
Fair: Slight agglomerated material generated
Poor: Much agglomerated material generated Example 1

$C_4F_9CH_2CH_2OCOC(CH_3)=CH_2$ (hereinafter referred to as "9FMA") (43.5 g), stearyl acrylate (hereinafter referred to as "StA") (9.2 g), N-methylolacrylamide (hereinafter referred to as "N-MAM") (1.2 g), 3-chloro-2-hydroxypropyl methacrylate (hereinafter referred to as "CHPMA") (0.6 g), nonionic surfactants, that is, EBD-12 (having HLB value of 12) (polyoxyethylene polyoxypropylene alkyl ether manufactured by NOF Corp.) (0.8 g) and LT-221 (having HLB value of 17) (polyoxyethylene sorbitan monolaurate manufactured by NOF Corp.) (3.0 g), stearyl trimethyl ammonium chloride (STMAC) (1.4 g), ion-exchanged water (86 g), lauryl mercaptan (0.03 g), and acetic acid (0.12 g) were charged. The mixture was warmed at 60° C., preliminarily dispersed by a homomixer, and emulsified for 15 minutes by an ultrasonic emulsifier. An average particle diameter after the emulsification was 175 nm.

The emulsified liquid was transferred into a 300 mL four-necked flask (equipped with a stirrer, a condenser tube, a thermometer, and a nitrogen-introducing pipe), and replaced with nitrogen. At 60° C., a polymerization initiator, that is, azobisamidinopropane dihydrochloride (0.3 g) was added to initiate the polymerization. After reacting at 60° C. for 4 hours, the disappearance of the monomer was confirmed by a gas chromatography (GC), and an aqueous dispersion of polymer having a solid content of 40% was obtained. The dispersion was diluted with ion-exchanged water to give a water- and oil-repellent composition having a solid content of 30%. The average particle diameter after the polymerization was 163 nm. The composition of the polymer was almost the same as the composition of the added monomers.

The characteristics of the water- and oil-repellent composition were evaluated. The results are shown in Table 3.

Examples 2 to 7, and Comparative Example 1

A water- and oil-repellent composition having a solid content of 30% was obtained in the same manner as in Example 1 except that only the types and amounts of the monomers are charged as in Table 3. The characteristics of the obtained composition were evaluated. The results are shown in Table 3.

Comparative Example 2

A water- and oil-repellent composition having a solid content of 30% was obtained in the same manner as in Example 1 except that the amount of ion-exchanged water was changed to 70 g and tripropylene glycol (16 g) as an auxiliary solvent was added. The characteristics of the obtained composition were evaluated. The results are shown in Table 3.

TABLE 3

| | Monomer | Specific gravity | Example 1 | 2 | 3 | 4 | 5 | 6 | 7 | Com. Ex. 1 | 2 |
|---|---|---|---|---|---|---|---|---|---|---|---|
| Fluorine-containing monomer | 9FMA | 1.40 | 43.5 | | 30.5 | | | | | | 43.5 |
| | 13FMA | 1.51 | | 43.5 | 13.0 | | | | | | |
| | 9FA | 1.44 | | | | 26.2 | | | | | |
| | 13FA | 1.56 | | | | 6.5 | | | | | |
| | 9FCA | 1.54 | | | | | 38.1 | 30.5 | 30.5 | | |
| | 13FCA | 1.63 | | | | | | 7.6 | 7.6 | | |
| | FA | 1.65 | | | | | | | | 32.7 | |
| Comonomer | StA | | 9.2 | 9.2 | | 20.0 | 14.6 | 14.6 | | 20.0 | 9.2 |
| | StMA | | | | 9.2 | | | | | | |
| | TCDA | | | | | | | | 14.6 | | |
| | N-MAM | | 1.2 | 1.2 | 1.2 | 1.2 | 1.2 | 1.2 | 1.2 | 1.2 | 1.2 |
| | CHPMA | | 0.6 | 0.6 | 0.6 | 0.6 | 0.6 | 0.6 | 0.6 | 0.6 | 0.6 |
| Water repellency | | | | | | | | | | | |
| | Ny | | 5 | 5 | 5 | 5 | 5 | 5 | 5 | 5 | 5 |
| | PET/C | | 4 | 5 | 4 | 4 | 5 | 5 | 4 | 5 | 4 |
| Oil repellency | | | | | | | | | | | |
| | Ny | | 2 | 4 | 3 | 2 | 4 | 4 | 4 | 3 | 2 |
| | PET/C | | 4 | 6 | 5 | 3 | 5 | 5 | 5 | 3 | 4 |
| Particle size after emulsification | | | 175 | 187 | 183 | 172 | 160 | 163 | 193 | 222 | 223 |
| Particle size after polymerization | | | 163 | 192 | 179 | 172 | 161 | 174 | 90 | 444 | 53 |
| Sedimentation stability | | | Good | Good | Good | Good | Good | Good | Good | Poor | Good |

TABLE 3-continued

| Monomer | Specific gravity | Example | | | | | | | Com. Ex. | |
|---|---|---|---|---|---|---|---|---|---|---|
| | | 1 | 2 | 3 | 4 | 5 | 6 | 7 | 1 | 2 |
| Mechanical stability | | Good | Good | Good | Good | Good | Good | Good | Fair | Fair |
| Chemical stability | | Good | Good | Good | Good | Good | Good | Good | Fair | Good |

9FMA: $C_4F_9CH_2CH_2OCOC(CH_3)=CH_2$
13FMA: $C_6F_{13}CH_2CH_2OCOC(CH_3)=CH_2$
9FA: $C_4F_9CH_2CH_2OCOCH=CH_2$
13FA: $C_6F_{13}CH_2CH_2OCOCH=CH_2$
9FCA: $C_4F_9CH_2CH_2OCOCCl=CH_2$
13FCA: $C_6F_{13}CH_2CH_2OCOCCl=CH_2$
FA: $C_nF_{2n+1}CH_2CH_2OCOCH=CH_2$ (a mixture of compounds wherein n is 8 and 10 in a weight ratio of 85/15)
StA: Stearyl acrylate
StMA: stearyl methacrylate
TCDA: Tricyclodecyl acrylate
N-MAM: N-methylolacrylamide
CHPMA: 3-chloro-2-hydroxypropyl methacrylate Example 8

$C_4F_9CH_2CH_2OCOC(CH_3)=CH_2$ (hereinafter referred to as "9FMA") (38.1 g), stearyl acrylate (hereinafter referred to as "StA") (14.6 g), N-methylolacrylamide (hereinafter referred to as "N-MAM") (1.2 g), 3-chloro-2-hydroxypropyl methacrylate (hereinafter referred to as "CHPMA") (0.6 g), nonionic surfactants, that is, EBD-12 (having HLB value of 12) (polyoxyethylene polyoxypropylene alkyl ether manufactured by NOF Corp.) (0.8 g) and LT-221 (having HLB value of 17) (polyoxyethylene sorbitan monolaurate manufactured by NOF Corp.) (3.0 g), stearyl trimethyl ammonium chloride (STMAC) (1.4 g), ion-exchanged water (86 g), lauryl mercaptan (0.03 g), and acetic acid (0.12 g) were charged. The mixture was warmed at 60° C., preliminarily dispersed by a homomixer, and emulsified for 15 minutes by an ultrasonic emulsifier. An average particle diameter after the emulsification was 180 nm.

The emulsified liquid was transferred into a 300 mL four-necked flask (equipped with a stirrer, a condenser tube, a thermometer, and a nitrogen-introducing pipe), and replaced with nitrogen. At 60° C., a polymerization initiator, that is, azobisamidinopropane dihydrochloride (0.3 g) was added to initiate the polymerization. After reacting at 60° C. for 4 hours, the disappearance of the monomer was confirmed by a gas chromatography (GC), and an aqueous dispersion having a solid content of 40% was obtained. The dispersion was diluted with ion-exchanged water to give a water- and oil-repellent composition having a solid content of 30%. The average particle diameter after the polymerization was 166 nm. The composition of the polymer was almost the same as the composition of the added monomers.

The characteristics of the water- and oil-repellent composition were evaluated. The results are shown in Table 4.

Examples 9 to 15, and Comparative Examples 3 to 6

A water- and oil-repellent composition having a solid content of 30% was obtained in the same manner as in Example 8 except that only the types and amounts of the emulsifiers are as in Table 4. The characteristics of the obtained composition were evaluated. The results are shown in Table 4.

TABLE 4

| Emulsifier | | HLB value | Example | | | | | | | Com. Ex. | | | |
|---|---|---|---|---|---|---|---|---|---|---|---|---|---|
| | | | 8 | 9 | 11 | 12 | 13 | 14 | 15 | 3 | 4 | 5 | 6 |
| Nonionic surfactant | EBD-12 | 12 | 0.8 | | | | | | | | | | |
| | EBD-9 | 9 | | 0.8 | | | | | | | | | |
| | EBD-4 | 4 | | | 0.8 | | | | | | | | |
| | SF-420 | 4 | | | | 0.8 | | | | | | | |
| | PP-40R | 7 | | | | | 0.8 | | | | | | |
| | EAD-8 | 8 | | | | | | | 1.2 | | | | |
| | LP-20R | 9 | | | | | | 0.8 | | | | | |
| | LT-221 | 17 | 3.0 | 3.0 | 3.0 | | | 3.0 | | | | | |
| | BT-20 | 16 | | | | | 3.0 | | | | | | |
| | SF-485 | 17 | | | | 3.0 | | | | | | | |
| | BL-9EX | 15 | | | | | | | 3.0 | | | | |
| | BO-50 | 18 | | | | | | | 1.0 | | | | |
| | Pronon 208 | 44 | | | | | | | | | 0.8 | | |
| | BO-20 | 17 | | | | | | | | | 3.0 | | |
| | BS-20 | 18 | | | | | | | | | | 3.8 | 1.4 |
| Ionic surfactant | STMAC | | 1.4 | 1.4 | 1.4 | 1.4 | 1.4 | 1.4 | | | 1.4 | | |
| | CPOEAC | | | | | | | | | 5.2 | 1.4 | | |
| | SPOEAS | | | | | | | | | | | | 0.8 |
| | STDS | | | | | | | | | | | | 3.0 |

TABLE 4-continued

| | HLB value | Example 8 | 9 | 11 | 12 | 13 | 14 | 15 | Com. Ex. 3 | 4 | 5 | 6 |
|---|---|---|---|---|---|---|---|---|---|---|---|---|
| Water repellency | | | | | | | | | | | | |
| Ny | | 5 | 5 | 5 | 5 | 5 | 5 | 4 | 5 | 5 | 5 | 1 |
| PET/C | | 4 | 4 | 4 | 4 | 4 | 4 | 3 | 2 | 2 | 3 | 2 |
| Oil repellency | | | | | | | | | | | | |
| Ny | | 2 | 2 | 2 | 2 | 2 | 2 | 2 | 1 | 1 | 2 | 0 |
| PET/C | | 4 | 4 | 4 | 4 | 4 | 4 | 2 | 2 | 2 | 1 | 0 |
| Particle size after emulsification | | 180 | 169 | 169 | 163 | 167 | 178 | 226 | 157 | 184 | 215 | 189 |
| Particle size after polymerization | | 166 | 139 | 138 | 134 | 188 | 209 | 238 | 252 | 254 | 262 | 231 |
| Sedimentation stability | | Good | Good | Good | Good | Good | Good | Good | Poor | Fair | Fair | Good |
| Mechanical stability | | Good | Good | Good | Good | Good | Good | Good | Poor | Poor | Poor | Good |
| Chemical stability | | Good | Good | Good | Good | Good | Good | Good | Poor | Good | Fair | Good |

EBD-12, EBD-9 and EBD-4: Polyoxyethylene polyoxypropylene alkyl ether (manufactured by NOF Corp.)
EAD-8: Polyoxyethylene alkyl ether (manufactured by NOF Corp.)
BL-9EX: Polyoxyethylene lauryl ether (manufactured by Nikko Chemicals Co., Ltd.)
SF-420 and SF-485: Acetylene glycol (polyoxyethylene) adduct (Surfinol 420 and 485 manufactured by Air Products and Chemicals, Inc.)
PP-40R: Sorbitan monopalmitate (manufactured by NOF Corp.)
LP-20R: Sorbitan monolaurate (manufactured by NOF Corp.)
LT-221: Polyoxyethylene sorbitan monolaurate (manufactured by NOF Corp.)
BT-20: polyoxyethylene secondary alkyl ether (manufactured by Nikko Chemicals Co., Ltd.)
BS-20: Polyoxyethylene stearyl ether (manufactured by Nikko Chemicals Co., Ltd.)
BO-20 and BO-50: Polyoxyethylene oleyl ether (manufactured by Nikko Chemicals Co., Ltd.)
Pronon 208: Polyoxyethylene polyoxypropylene block copolymer (manufactured by NOF Corp.)
STMAC: Stearyl trimethyl ammonium chloride
CPOEAC: Coconut oil alkyl bis(polyoxyethylene) methyl ammonium chloride
SPOEAS: Sodium polyoxyethylene alkyl ether sulfate
STDS: Sodium tetradecene sulfonate

Example 16

Polymer Containing Vinyl Chloride $C_4F_9CH_2CH_2OCOC(CH_3)=CH_2$ (hereinafter referred to as "9FMA") (87.2 g), stearyl acrylate (hereinafter referred to as "StA") (11.3 g), N-methylolacrylamide (hereinafter referred to as "N-MAM") (2.8 g), 3-chloro-2-hydroxypropyl methacrylate (hereinafter referred to as "CHPMA") (0.7 g), nonionic surfactants, that is, PP-40R (having HLB value of 7) (sorbitan monopalmitate manufactured by NOF Corp.) (2.1 g), BO-50 (having HLB value of 18) (polyoxyethylene oleyl ether manufactured by Nikko Chemicals Co., Ltd.) (2.1 g) and PBC-44 (having HLB value of 13) (polyoxyethylene polyoxypropylene cetyl ether manufactured by Nikko Chemicals Co., Ltd.) (6.4 g), a cationic surfactant, that is, distearyl dimethyl ammonium chloride (2.3 g), ion-exchanged water (272.3 g), lauryl mercaptan (0.5 g), and acetic acid (0.7 g) were charged. The mixture was warmed at 60° C., preliminarily dispersed by a homomixer, and emulsified for 15 minutes by an ultrasonic emulsifier. An average particle diameter after the emulsification was 182 nm.

The emulsified liquid was transferred into a 1,000 mL autoclave (equipped with a stirrer, a thermometer, and a nitrogen-introducing pipe). The autoclave was replaced with nitrogen and vinyl chloride (33.0 g) was charged. A polymerization initiator, that is, azobisamidinopropane dihydrochloride (1.0 g) was added and the mixture was heated at 60° C. to initiate the polymerization.

After reacting at 60° C. for 4 hours, unreacted vinyl chloride was discharged. The conversion of vinyl chloride was 80%. The disappearance of the other monomers was confirmed by a gas chromatography (GC), and an aqueous dispersion having a solid content of 32% was obtained. The dispersion was diluted with ion-exchanged water to give a water- and oil-repellent composition having a solid content of 30%. The average particle diameter after the polymerization was 173 nm.

The characteristics of the water- and oil-repellent composition were evaluated. The water repellency, oil repellency and stability were good.

The summary of the above-mentioned matters are as follows:

In a water- and oil-repellent composition, the use of short chain Rf group in the polyfluoroalkyl group (or polyfluoroalkenyl group) -containing polymerizable monomer which is a foundation of exhibiting the water- and oil-repellency improves the sedimentation stability (there is little sedimentation at the time of storage of the resin dispersion particles of the composition obtained as the aqueous dispersion);

the limitation of properties (Tg and Tm) of the comonomer prevents the deterioration of water- and oil-repellency; and the use of combination of specified surfactants achieves excellent stability (mechanical stability, chemical stability and long-term storability) without containing an operatively and environmentally undesirable solvent.

The invention claimed is:

1. An aqueous water- and oil-repellent composition comprising:
   (A) a fluorine-containing copolymer which comprises:
      (a1) a polymerizable monomer which contains a polyfluoroalkyl or polyfluoroalkenyl group having 1 to 6 carbon atoms,
      (a2) a polymerizable monomer copolymerizable with the monomer (a1), and
      if necessary, in addition to the polymerizable monomers (a1) and (a2),
      (a3) a polymerizable monomer containing a polar group or a reactive group,
      the amount of the polymerizable monomer (a1) is at least 20% by weight based on the copolymer;
   (B) a surfactant which comprises:
      (b1) a nonionic surfactant having an HLB of at most 12, and
      (b2) a nonionic surfactant having an HLB of at least 15,
   (C) an aqueous medium (C) which essentially consists of water,
      wherein the polymerizable monomer (a2) constituting the fluorine-containing copolymer (A) is such polymerizable monomer that a homopolymer of the polymerizable monomer (a2) has a glass transition temperature (Tg) of at least 55° C., and/or a melting point (Tm) of at least 30° C.

2. The aqueous water- and oil-repellent composition according to claim 1, wherein the surfactant (B) contains also (b3) a cationic surfactant.

3. The aqueous water- and oil-repellent composition according to claim 1, wherein the polymerizable monomer (a1) has a specific gravity of at most 1.63.

4. The aqueous water- and oil-repellent composition according to claim 1, wherein the component (a1) is from 40 to 95% by weight, the component (a2) is from 5 to 60% by weight, and the component (a3) is from 0 to 15% by weight based on the fluorine-containing copolymer (A).

5. The aqueous water- and oil-repellent composition according to claim 1, wherein the component (b1) in the surfactant (B) is a nonionic surfactant having an HLB of at most 10.

6. The aqueous water- and oil-repellent composition according to claim 1, wherein the nonionic surfactant (b1) and (b2) have a structure individually selected from the group consisting of an alkylene oxide adduct of linear saturated or unsaturated aliphatic group; an alkylene oxide adduct of branched saturated or unsaturated aliphatic group; a sorbitan ester; an alkylene oxide adduct of a sorbitan ester; a polyalkylene glycol ester of a linear saturated or unsaturated fatty acid; and a polyalkylene glycol ester of a branched saturated or unsaturated fatty acid, and said structures do not contain an aromatic group.

7. The aqueous water- and oil-repellent composition according to claim 1, wherein the structure of alkylene oxide added moiety and the polyalkylene glycol moiety in the nonionic surfactants (b1) and (b2) are polyoxyethylene (POE), polyoxypropylene (POP), or a POE/POP copolymer.

8. The aqueous water- and oil-repellent composition according to claim 2, wherein the cationic surfactant (b3) has the structure of the formula:

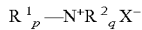

wherein $R^1$ is a linear saturated or unsaturated aliphatic group having at least 12 carbon atoms or a branched saturated or unsaturated aliphatic group having at least 12 carbon atoms,
   $R^2$ is H or a $C_{1-4}$ alkyl group,
   X is halogen, or a $C_{1-4}$ fatty acid anion group,
   p is 1 or 2, and q is 2 or 3, provided that p+q=4; and
   the cationic surfactant (b3) is an ammonium salt free from an ethylene oxide group and an aromatic group.

9. The aqueous water- and oil-repellent composition according to claim 1, wherein the fluorine-containing copolymer has a particle size of at most 0.25 micrometers.

10. A method of producing the aqueous water- and oil-repellent composition according to claim 1, comprising charging collectively the polymerizable monomers (a1), (a2) and (a3), the surfactant (B), and the aqueous medium (C), emulsifying them and then conducting the polymerization.

11. The method according to claim 10 wherein, in the case that at least one polymerizable monomer is a gaseous monomer, the raw materials except the gaseous monomer are collectively charged and then emulsified, and the gaseous monomer is charged before the polymerization.

12. The method according to claim 10, wherein an ultrasonic emulsifier or a high pressure homogenizer is used to conduct the emulsification so that the emulsified particles have a particle size of at most 0.2 micrometers.

13. A method of treating a substrate, comprising treating the substrate with the aqueous water- and oil-repellent agent according to claim 1.

14. A treated material which is obtained by the method according to claim 13.

* * * * *